No. 691,538. Patented Jan. 21, 1902.
F. FRIGERIO.
DRIVING GEAR FOR BELTED MACHINES.
(Application filed Dec. 7, 1900.)
(No Model.)
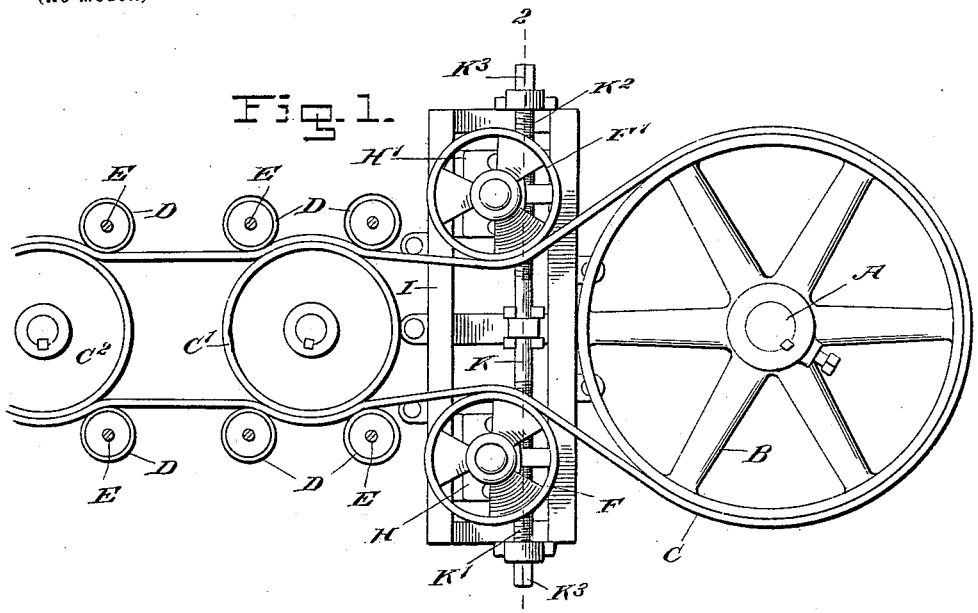
Fig. 1.
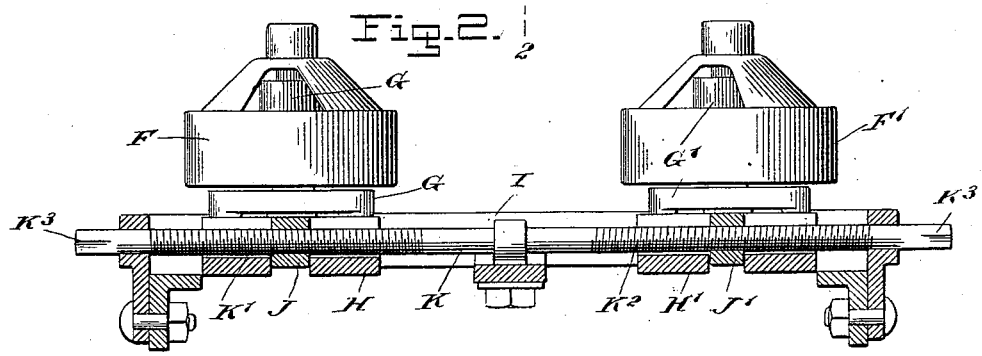
Fig. 2.
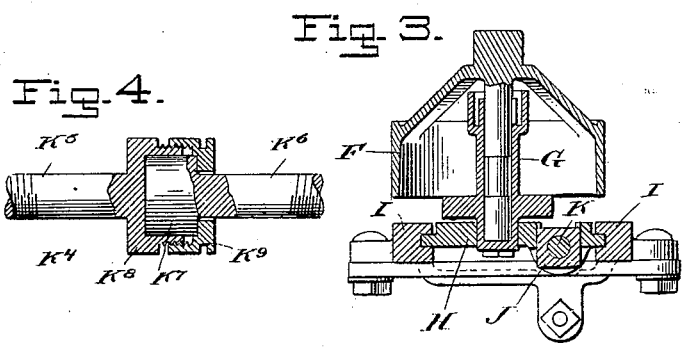
Fig. 4. Fig. 3.
WITNESSES:
INVENTOR
Frank Frigerio
BY
ATTORNEYS

UNITED STATES PATENT OFFICE.

FRANK FRIGERIO, OF WHITEHAVEN, PENNSYLVANIA, ASSIGNOR OF ONE-HALF TO PETER MAGAGUA, OF FREELAND, PENNSYLVANIA.

DRIVING-GEAR FOR BELTED MACHINES.

SPECIFICATION forming part of Letters Patent No. 691,538, dated January 21, 1902.

Application filed December 7, 1900. Serial No. 39,025. (No model.)

*To all whom it may concern:*

Be it known that I, FRANK FRIGERIO, a citizen of the United States, and a resident of Whitehaven, in the county of Luzerne and State of Pennsylvania, have invented a new and Improved Driving-Gear for Belted Machines, of which the following is a full, clear, and exact description.

The invention relates to machines driven by belts, ropes, or cables, but is hereinafter described with special reference to its application to silk-spinning machines, in which a large number of spindles are simultaneously driven by an endless belt.

The object of the invention is to provide a new and improved driving-gear for spinning-machines arranged to permit proper adjusting and tightening of both runs of the driving-belt to insure a uniform rate of speed of the spindles to be driven.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is an enlarged transverse section of the same on the line 2 2 in Fig. 1. Fig. 3 is an enlarged sectional side elevation of the same, and Fig. 4 is a sectional side elevation of a modified form of screw-rod.

On a vertically-disposed driven shaft A is secured a pulley B, over which passes an endless belt C, also passing over a row of idlers C′ C², journaled in suitable bearings in the frame of the spinning-machine, pairs of pulleys D on spindles E engaging the runs of the belt at the outer faces thereof in close proximity to the idlers, as is plainly indicated in Fig. 1. The outer faces of the runs of the belt C are also engaged by tightening-pulleys F F′, located between the driven pulley B and the idler C′ in the row of idlers. The tightening-pulleys F F′ are journaled on bearings G G′, secured on slides H H′, respectively, mounted to slide transverely in a guideway I, secured to the frame of the spinning-machine. On the slides H H′ are held nuts J J′, engaged by the right and left hand threaded portions of a screw-rod K, mounted to turn in suitable bearings in the guideway I, the ends of the screw-rod being preferably formed with polygonal offsets for the application of a handle, wheel, wrench, or other tool to permit the operator to turn the said screw-rod, so as to move the nuts J J′, and consequently the slides H H′, bearings G G′, and pulleys F F′, toward or from each other, according to the direction in which the screw-rod K is turned.

When the belt is new, the tightening-pulleys F F′ are far apart; but when the machine has been in use for some time the belt lengthens by use, and in order to insure a proper uniform driving of the spindle C it is necessary that the belt be tightened. For this purpose the operator simply turns the screw-rod K to move the pulleys F F′ toward each other, and as the said pulleys engage the outer faces of the runs of the belt between the driven pulley B and the first idler C′ it is evident that the belt is tightened, and consequently a proper transmission of power from the shaft A to the spindles E takes place.

It will be seen that by having the shaft disposed vertically and the pulleys F F′, idlers C′ C², and pulleys D arranged as described it is evident that a very direct transmission of power takes place and without danger of the belt slipping or creating undue friction, as is so frequently the case with driving-gear as heretofore used for silk-spinning machines.

The nuts J J′ are arranged in vertical guideways in the slides H H′ and are held from turning therein, but are free to move longitudinally on the screw-rod to move the slides, as described, the arrangement allowing the nuts to adjust themselves according to the position of the screw-rod mounted to turn in the fixed bearings.

As shown in Fig. 4, the screw-rod K⁴ is made in two sections K⁵ and K⁶, of which the section K⁶ has a head K⁷ fitting into a socket K⁸ on the other section K⁵ to permit of turning each screw-rod section independent of the other in case one run only of the belt is slack and requires tightening. A coupling K⁹ screws on the socket $K^8$ and engages the head $K^7$ to permit of securing the sections together to revolve both when one is turned.

Having thus fully described my invention, I claim as new and desire to secure by Letters Patent—

1. A driving-gear for belted machines, comprising an upright driven shaft having a pulley, an endless belt passing over said pulley, spindle-pulleys in oppositely-arranged pairs at the outer face of the runs of said belt, idler-pulleys engaging both runs of the belt and each holding the belt in contact with two oppositely-arranged pairs of spindle-pulleys, and means for adjusting and tightening the belt, as set forth.

2. A driving-gear for belted machines, comprising an upright driven shaft having a pulley, an endless belt passing over said pulley, spindle-pulleys arranged at the outer faces of the runs of said belt, a row of idler-pulleys engaging both runs of the belt and holding the belt in contact with the spindle-pulleys, and a pair of belt adjusting and tightening pulleys engaging the outer faces of the runs of the belt between the driven-shaft pulley and the first idler in the row of idlers, as set forth.

3. A driving-gear for belted machines, comprising an upright driven shaft having a pulley, an endless belt passing over said pulley, a row of idlers over which passes the endless belt, spindle-pulleys in contact with the belt at said idlers, a pair of belt adjusting and tightening pulleys engaging the outer faces of the runs of the belt between the driven-shaft pulley and the first idler in the row of idlers, and means for simultaneously moving the belt adjusting and tightening pulleys toward or from each other, as set forth.

4. A belt adjusting and tightening device, comprising a fixed guideway, slides movable in said guideway, and each having a vertical guideway formed therein, bearings for tightening-pulleys carried by said slides, nuts held in the vertical guideways in the said slides, and means for moving the said nuts longitudinally to carry the slides toward or from each other, as set forth.

5. A belt adjusting and tightening device, comprising a fixed guideway, slides movable longitudinally in said guideway, tightening-pulleys having vertically-arranged spindles journaled in bearings carried at the upper face of said slides, nuts held in vertical guideways in the said slides, and a longitudinally-extending screw-rod engaging the said nuts, as set forth.

6. A belt adjusting and tightening device, comprising a fixed guideway, slides movable in said guideway, bearings carried by said slides for the tightening-pulleys, nuts mounted to move vertically in said slides but held against turning therein, and a screw-rod mounted to turn in bearings carried by said guideway, the screw-rod having right and left hand threaded portions screwing in said nuts, as set forth.

In testimony whereof I have signed my name to this specification in the presence of two subscribing witnesses.

FRANK FRIGERIO.

Witnesses:
 DANL. HEIMBACH,
 JOHN J. BAKER, Jr.